United States Patent
Ashley et al.

(10) Patent No.: US 7,283,956 B2
(45) Date of Patent: Oct. 16, 2007

(54) NOISE SUPPRESSION

(75) Inventors: James Patrick Ashley, Naperville, IL (US); Tenkasi Vaideeswaran Ramabadran, Naperville, IL (US); Michael Joseph McLaughlin, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 871 days.

(21) Appl. No.: 10/245,963

(22) Filed: Sep. 18, 2002

(65) Prior Publication Data

US 2004/0052384 A1    Mar. 18, 2004

(51) Int. Cl.
    G10L 21/00    (2006.01)
    G10L 21/02    (2006.01)

(52) U.S. Cl. ............. 704/228; 704/233; 704/224; 704/225; 704/226; 704/227

(58) Field of Classification Search ............. None
    See application file for complete search history.

(56) References Cited

U.S. PATENT DOCUMENTS

| | | | |
|---|---|---|---|
| 4,627,103 A * | 12/1986 | Fukuhara | 455/226.3 |
| 4,628,529 A * | 12/1986 | Borth et al. | 381/94.3 |
| 4,630,304 A * | 12/1986 | Borth et al. | 381/94.3 |
| 4,811,404 A | 3/1989 | Vilmur et al. | |
| 5,323,337 A * | 6/1994 | Wilson et al. | 702/73 |
| 5,544,250 A * | 8/1996 | Urbanski | 381/94.3 |
| 5,659,622 A | 8/1997 | Ashley | |
| 5,937,377 A * | 8/1999 | Hardiman et al. | 704/225 |
| 6,104,993 A | 8/2000 | Ashley | |
| 6,415,253 B1 * | 7/2002 | Johnson | 704/210 |
| 6,453,289 B1 * | 9/2002 | Ertem et al. | 704/225 |
| 6,453,291 B1 * | 9/2002 | Ashley | 704/233 |
| 6,718,301 B1 * | 4/2004 | Woods | 704/233 |
| 6,862,567 B1 * | 3/2005 | Gao | 704/228 |

OTHER PUBLICATIONS

Ramabadran, T.; Ashley, J.; McLaughlin, M.; "Background Noise Suppression for Speech Enhancement And Coding", Jun. 1997 EEE. Workshop on Speech Coding.

* cited by examiner

*Primary Examiner*—David Hudspeth
*Assistant Examiner*—Eunice Ng

(57) ABSTRACT

A method and apparatus for noise suppression is described herein. The channel gain is controlled based on a degree of variability of the background noise. The noise variability estimate is used in conjunction with a variable attenuation concept to produce a family of gain curves that are adaptively suited for a variety of combinations of long-term peak SNR and noise variability. More specifically, a measure of the variability of the background noise is used to provide an optimized threshold that reduces the occurrence of non-stationary background noise entering into the transition region of the gain curve.

14 Claims, 4 Drawing Sheets

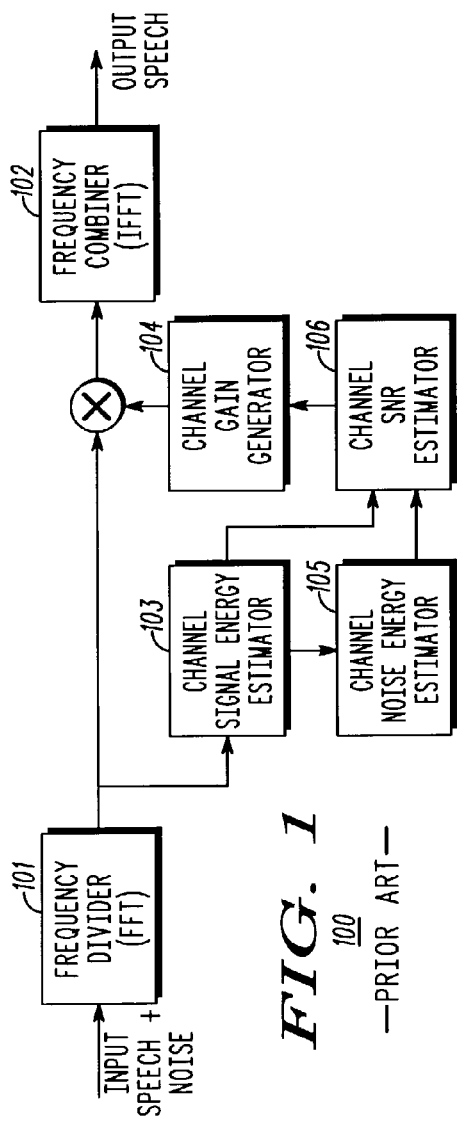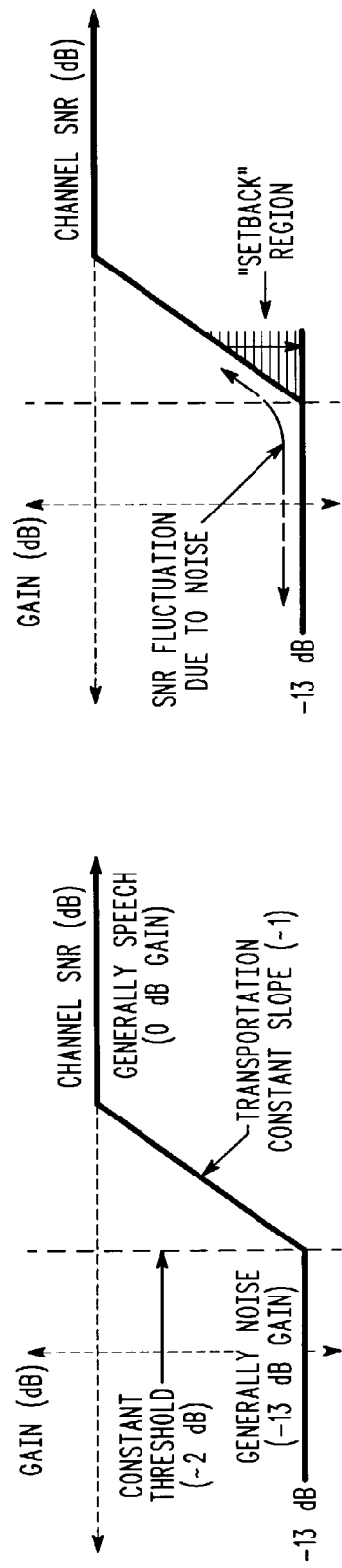
FIG. 1
—PRIOR ART—
FIG. 2
—PRIOR ART—
FIG. 3
—PRIOR ART—

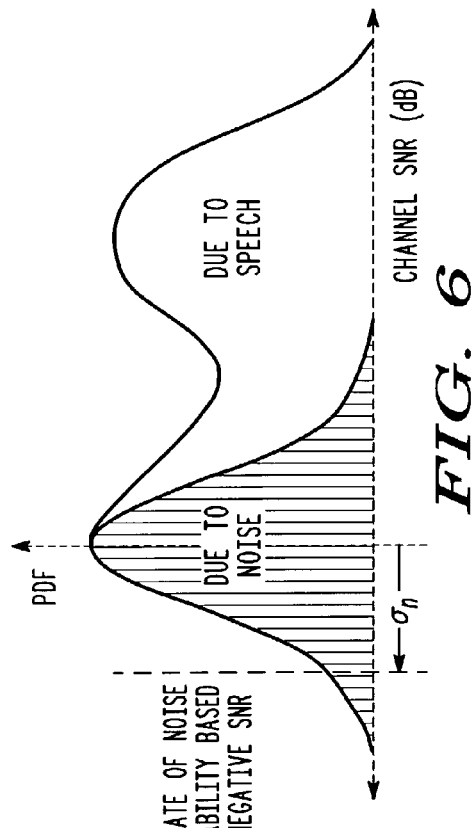
FIG. 4 —PRIOR ART—
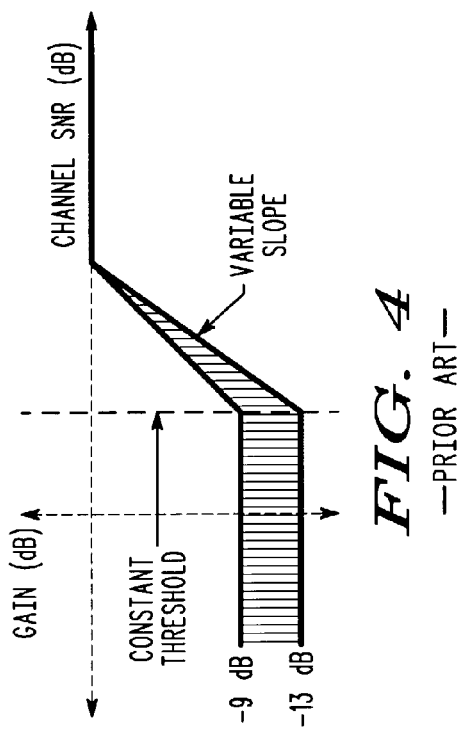
FIG. 6
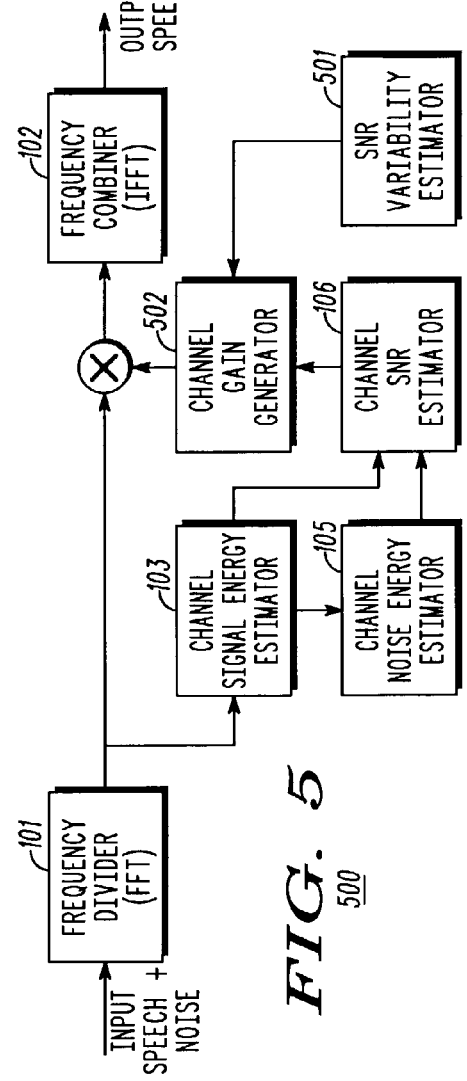
FIG. 5
500

NOISE SUPPRESSION

FIELD OF THE INVENTION

The present invention relates generally to noise suppression and in particular, to background noise suppression for speech within a speech coding system.

BACKGROUND OF THE INVENTION

Cellular telephones, speaker phones, and various other communication devices utilize background noise suppression to enhance the quality of a received signal. In particular, the presence of acoustic background noise can substantially degrade the performance of a speech communication system. The problem is exacerbated when a narrow-band speech coder is used in the communication link since such coders are tuned to specific characteristics of clean speech signals and handle noisy speech and background noise rather poorly.

A simplified block diagram of the basic noise suppression system 100 is shown in FIG. 1. Such a system is typically utilized to attenuate the input speech/noise signal when signal-to-noise (SNR) values are low. As shown, system 100 includes fast Fourier transformer (FFT) 101, and inverse FFT 102, total channel energy estimator 103, noise energy estimator 105, SNR estimator 106, and channel gain generator 104. During operation, the input signal (comprised of speech plus noise) is transformed into the frequency domain by FFT 101 and grouped into channels that are similar to critical bands of hearing. The channel signal energies are computed via estimator 103, and the background noise channel energies are conditionally updated via estimator 105 as a function of the spectral distance between the signal energy and noise energy estimates. From these energy estimates, the channel SNR vector is computed by estimator 106, which is then used to determine the individual channel gains. The channel gains are then applied via a mixer to the original complex spectrum of the input signal and inverse transformed, using the overlap-and-add method, to produce the noise suppressed output signal. As discussed above, when SNR values are estimated to be low, attenuation of the FFT signal takes place.

FIG. 2 shows the basic gain as a function of SNR for prior-art systems. From FIG. 2 it can be seen that for low channel SNR (i.e., less than an SNR threshold), the signal is presumed to be noise, and the gain for that channel is set to the minimum (in this case, −13 dB). As the SNR increases past the SNR threshold, the gain function enters a transition region, where the gain follows a constant slope of approximately 1, meaning that for every dB increase in SNR, the gain is increased by 1 dB. As the SNR is increased further (generally speech) the gain is clamped at 0 dB so as not to increase the power of the input signal. This gain function is representative of each channel of the communication system such that it is possible to have the gain in one channel be 0 dB while it can be −13 dB in another.

Although the above technique does serve to reduce the background noise, it was observed that background noise could produce annoying artifacts when entering the transition region of the gain curve since background noise will have short-term SNR fluctuations around the 0 dB origin since the channel noise energy estimator smoothes the energy via low-pass filtering. As a result, the channel energy estimate moves quicker than the respective noise energy estimate, and the short-term fluctuations in SNR (and subsequently, gain) cause "waterfall" or "swirling" artifacts. To circumvent this problem, prior-art techniques have proposed a method by which the channel SNR estimate is modified to include a process that 1) detects spurious activity in the transition region, and 2) sets the channel SNR back to zero when the signal is spurious. This method is illustrated in FIG. 3.

A problem exists in that in order to detect that a channel SNR is "spurious", it is required that only "some" of the channel SNRs enter into the transition region. This is fine for stationary noises that have uncorrelated frequency components (e.g., wind noise in a car), but in cases where the frequency components are correlated (e.g., office noise, interfering talkers, impulsive noise, etc.), the method cannot discriminate between non-stationary background noise and speech.

More recent efforts to improve Noise Suppression performance have focused on a "variable attenuation" concept. In order to alleviate these unpleasant effects, the algorithm was modified to adaptively reduce the amount of noise reduction during severe SNR conditions. FIG. 4 shows the modified channel gain function, and how the gain changes relative to the instantaneous SNR for each channel. For this method, the overall long-term peak SNR dictates the minimum amount of gain applied to the noise component of the signal. A constant SNR threshold is used and the gain slope is varied to intersect the 0 dB gain axis at the same channel SNR. The minimum gains are also clamped to be variable only between −9 and −13 dB.

While this method has proven to be effective in low SNR environments, it does not address the ongoing problem of non-stationary, impulsive type noises. Thus a need exists to improve performance of prior-art noise suppression systems for non-stationary noises, while maximizing the benefits associated with the variable attenuation concept.

BRIEF DESCRIPTION OF THE DRAWINGS

FIG. 1 is a block diagram of a prior-art noise suppression system.

FIG. 2 is a graph illustrating prior-art channel gain as a function of SNR.

FIG. 3 is a graph illustrating prior-art channel gain as a function of SNR.

FIG. 4 is a graph illustrating prior-art channel gain as a function of SNR.

FIG. 5 is a block diagram of a noise suppression system in accordance with the preferred embodiment of the present invention.

FIG. 6 is a graph illustrating a noise component of a received signal.

DETAILED DESCRIPTION OF THE DRAWINGS

Figure 7:
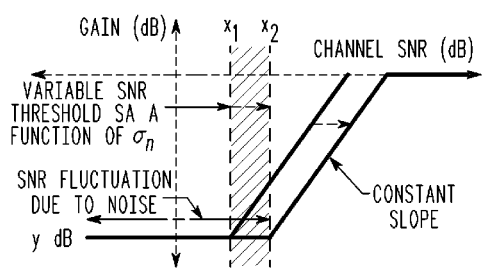
FIG. 7 is a graph illustrating channel gain as a function of noise variation in accordance with a first embodiment of the present invention.

To address the above-mentioned need, a method and apparatus for noise suppression is described herein. In accordance with the preferred embodiment of the present invention a channel gain is additionally controlled based on a degree of variability of the background noise. The noise variability estimate is used in conjunction with the variable attenuation concept to produce a family of gain curves that are adaptively suited for a variety of combinations of long-term peak SNR and noise variability. More specifically, a measure of the variability of the background noise is used to provide an optimized threshold that reduces the occurrence of non-stationary background noise entering into the transition region of the gain curve.

Utilizing this technique for adjusting the gain of a speech-plus-noise signal results in improved performance over prior-art noise suppression systems for non-stationary noises, while maximizing the benefits associated with the variable attenuation concept The present invention encompasses an apparatus comprising a noise variability estimator determining an amount of variability of background noise in a speech-plus-noise signal, and a channel gain generator adjusting a gain applied to the speech-plus-noise signal based on the amount of variability in the background noise.

The present invention additionally encompasses an apparatus for noise suppression. The apparatus comprises a channel signal energy estimator for estimating a total energy of a speech-plus-noise signal, a noise energy estimator for estimating a noise energy of the speech-plus-noise signal, a channel signal-to-noise (SNR) estimator having the noise energy estimate and the total energy estimate as an input and outputting an SNR estimate of the speech-plus-noise signal, a SNR variability estimator for estimating the SNR variability of the speech-plus-noise signal, and a channel gain generator for attenuating the speech-plus-noise signal based on the SNR variability of the speech-plus-noise signal.

The present invention additionally encompasses a method for noise suppression, the method comprising the steps of estimating an amount of variability in background noise in a speech-plus-noise signal and adjusting a gain applied to the speech-plus noise signal based on the amount of variability in the background noise.

Turning now to the drawings, wherein like numerals designate like components, FIG. 5 is a block diagram of a noise-suppression system in accordance with the preferred embodiment of the present invention. As is evident, a noise variability estimator 501 has been added to noise suppression circuit 100. Additionally, channel gain generator 502 adjusts attenuation based on the noise variability output from estimator 501.

In order to facilitate the use of the present invention, a method for measuring the variability of the background noise is needed. One such method utilizes the variability of SNR, and has been developed for use in a Voice Activity Detection (VAD) algorithm, as disclosed in U.S. patent application Ser. No. 09/293,448, entitled APPARATUS AND METHOD FOR VOICE ACTIVITY DETECTION IN A COMMUNICATIONS SYSTEM. The problem in estimating noise variability (i.e., how stationary the noise is) in a speech-plus-noise signal is that it is very difficult to know in advance whether the signal under analysis is noise or speech plus noise, especially when the background noise may be composed of interfering speech. In the preferred embodiment of the present invention a presumption is made that the background noise is uncorrelated with the speech component, and that the addition of the speech component to the background noise will always produce an increase in channel SNR. The follow-on presumption is that variations in negative channel SNR can only be attributed to the background noise itself. Thus, the variability of the background noise is estimated by measuring the fluctuations in negative channel SNR. FIG. 6 illustrates this concept by showing a power-density function of a speech-plus-noise signal as a function of channel SNR.

Once the variation in channel noise is determined, in a first embodiment of the present invention the channel gain generator adjusts the attenuation of the speech/noise FFT signal as illustrated in FIG. 7. More particularly, a high variability in the background noise causes the SNR threshold (e.g., that point in SNR where attenuation begins to increase from its minimum value) to increase from $x_1$ to $x_2$, effectively shifting the gain curve to the right. This has the effect of preventing spurious noise from entering the transition region of the gain curve, thereby reducing the occurrence of uneven (non-uniform) suppression of non-stationary noise. Note that for the preferred embodiment of the present invention, the gain slope is chosen to be constant, which has the following underlying implications:

First, the prior-art variable slope technique (used in FIG. 4) was not deemed appropriate since the Variable SNR threshold can have a relatively large dynamic range. This can cause the slope to be so steep that the gain function can exhibit "gating" artifacts.

Secondly, non-stationary noises may be more likely to be encountered in practice at higher SNRs. Thus, the effect of shifting the gain curve to the right on the 0 dB gain axis has the effect of attenuating only very low-level speech.

Figure 8:
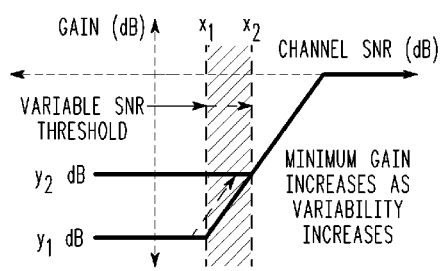
FIG. 8 is a graph illustrating channel gain as a function of noise variation in accordance with a second embodiment of the present invention.

If, on the other hand, it is expected that low SNR, high variability noise may be encountered in practice, the gain curve of FIG. 8 may be employed. In this second embodiment, the measure of background noise variability controls the SNR threshold, which (in this embodiment) is constrained to be between $x_1$ and $x_2$ dB. But instead of shifting the gain curve in response to the variable SNR threshold, the current embodiment provides a direct proportional change in minimum gain (while holding the gain slope in a fixed position). This in effect reduces the amount of attenuation for highly variable background noise, as opposed to risking the attenuation of low-level speech components as in the first embodiment.

Figure 9:
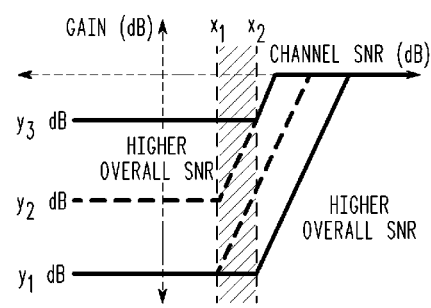
FIG. 9 is a graph illustrating channel gain as a function of noise variation in accordance with a third embodiment of the present invention.

In the preferred embodiment of the present invention a combination of the first two embodiments is implemented, as shown in FIG. 9. Here, the gain characteristic is driven by a combination of the overall SNR estimate and the background noise variability. During high overall SNR, the tendency is to provide lower minimum gain ($y_1$ dB) and allow the variable SNR threshold to shift the gain curve to the right. In a low SNR environment, the minimum gain is increased ($y_2$ dB), and the effect of a high variability factor causes the minimum gain to increase further ($y_3$ dB). More particularly, the method given in /TIA/EIA/IS-127 entitled "Enhanced Variable Rate Codec, Speech Service Option 3 for Wideband Spread Spectrum Digital Systems", defines the channel gains (in dB) to be:

$$\gamma_{DB}(i)=\mu_g(\sigma_q''(i)-\sigma_{th})+\gamma_n; \ 0 \leq i < N_c, \quad (1)$$

where $\mu_g$ is the gain slope, $\sigma_q''(i)$ is the channel SNR for channel i, $\sigma_{th}$ is the SNR threshold, $\gamma_n$ is the minimum overall gain (e.g., −13 dB), and $N_c$ is the number of frequency channels. The result of this equation is further constrained to be within $\gamma_n \leq \gamma_{DB}(i) \leq 0$.

From these equations it can be seen that any channel SNR $\sigma_q''(i)$ below the SNR threshold $\sigma_{th}$ will result in the minimum channel gain $\gamma_n$ being applied to that channel i. As the channel SNR exceeds the SNR threshold, the transition region of the gain curve is entered, until a point at which the gain is limited to 0 dB. In the preferred embodiment of the present invention, the SNR threshold and minimum gain are allowed to vary as a function of variability of the background noise $\sigma_n$, (i.e., $\gamma_n \rightarrow \gamma(\sigma_n)$, $\sigma_{th} \rightarrow \sigma_{th}(\sigma_n)$). From this, the equation given in (1) can be modified in accordance with the current invention as:

$$\gamma_{DB}(i) = \mu_g(\sigma_q''(i) - \sigma_{th}(\sigma_n)) + \gamma(\sigma_n); 0 \leq i < N_c, \quad (2)$$

which is subsequently limited by: $\gamma(\sigma_n) \leq \gamma_{DB}(i) \leq 0$. These equations reflect the gain characteristic as shown in FIG. 9.

Figure 10:
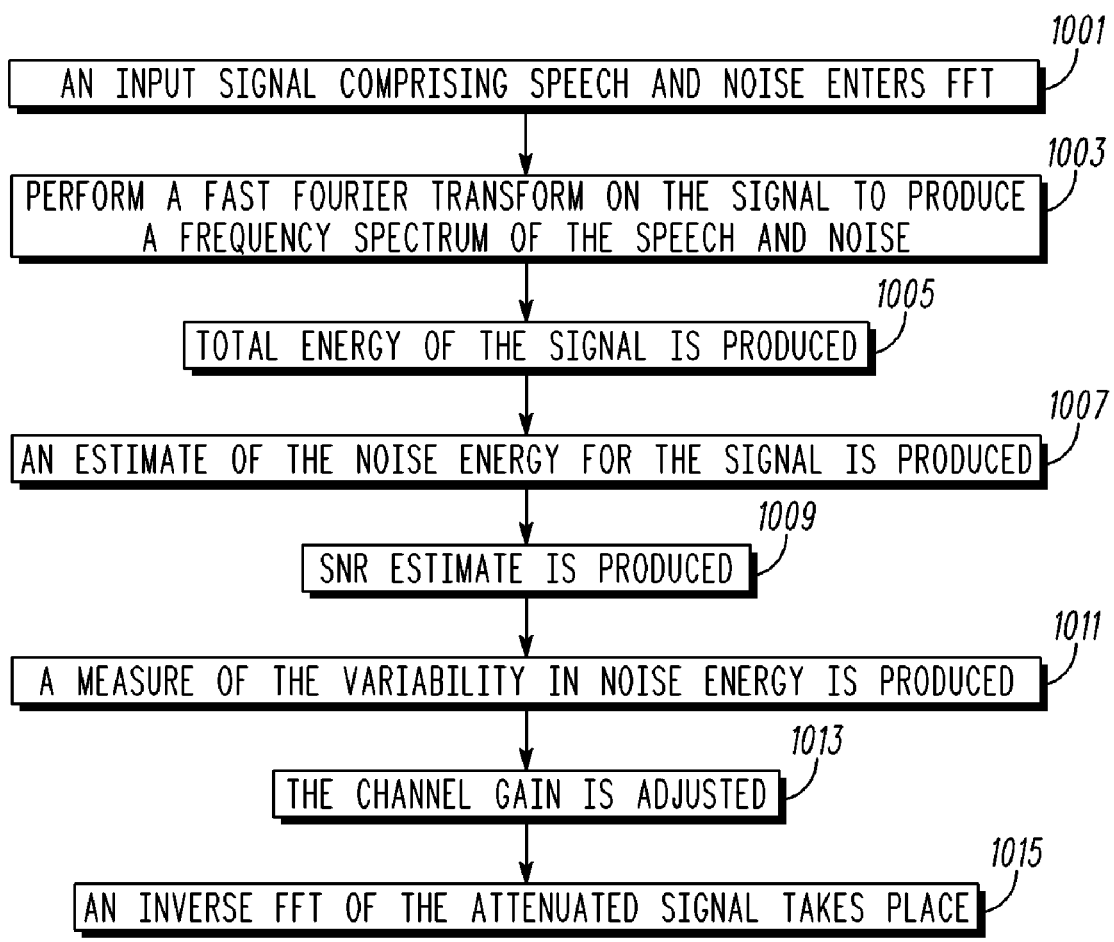
FIG. 10 is a flow chart showing operation of the noise suppression system of FIG. 5.

FIG. 10 is a flow chart showing operation of the noise suppression system of FIG. 5 in accordance with the preferred embodiment of the present invention. The logic flow begins at step 1001 where an input signal comprising speech and noise enters FFT 101. FFT 101 performs a fast Fourier transform on the signal to produce a frequency spectrum of the speech and noise signal similar to the spectrum illustrated in FIG. 6 (step 1003). The FFT of the speech/noise signal enters channel energy estimator 103 where a total energy of the signal is produced (step 1005). The energy estimate is output to noise energy estimator 105 where an estimate of the noise energy for the signal is produced (step 1007). A SNR estimate is then produced by estimator 106 based on the total energy and the noise energy (step 1009). Additionally, an estimate of the variability of background noise in the speech/noise signal is produced by estimator 501 at step 1011. In the preferred embodiment of the present invention an estimate of the variation in noise is produced as described above, however, one of ordinary skill in the art will recognize that any estimate of noise variation (e.g., standard deviation, variance, . . . , etc.) may be utilized in alternate embodiments.

Continuing, once the variability in the SNR is determined, it is output to channel gain generator 502 along with the SNR estimate where the channel gain is adjusted accordingly (step 1013) based on the amount of variability in the background noise of the speech/noise signal. Finally, at step 1015 an inverse FFT of the attenuated signal takes place by IFFT circuitry 102.

As described above, in a first embodiment of the present invention, the channel gain is adjusted based on the SNR and the SNR variation such that voice/noise signal is attenuated a first amount when the SNR variation is high, otherwise the signal is attenuated a second amount as illustrated in FIG. 7. More particularly, as discussed above, a high variability in the background noise causes the SNR threshold to increase from $x_1$ to $x_2$, effectively shifting the gain curve to the right. That is, the SNR value (x) at which the channel gain increases from its minimum value is increased from $x_1$ to $x_2$. Thus, the speech-plus-noise signal will have a maximum attenuation when the SNR value of the speech-plus-noise signal is below the SNR threshold. This has the effect of preventing spurious noise from entering the transition region of the gain curve, thereby reducing the occurrence of uneven (non-uniform) suppression of non-stationary noise.

Additionally, in the second embodiment a maximum attenuation of the signal is additionally based on the variability in background noise (SNR variation) as shown in FIG. 8. During high overall SNR, the a lower minimum gain ($y_1$ dB) is provided which allows the variable SNR threshold to shift the gain curve to the right. In a low SNR environment, the minimum gain is increased ($y_2$ dB), and the effect of a high variability factor causes the minimum gain to increase further ($y_3$ dB).

Finally, in a third, and preferred embodiment a combination of the first two embodiments takes place. In particular, for the same SNR value the attenuation of the signal will vary, based on the variability of the SNR, with higher amounts of attenuation taking place in situations with higher SNR variation levels. Additionally, the maximum amount of attenuation will vary based on the SNR variability, with a more attenuation of signals with higher SNR variability taking place.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. An apparatus comprising:
   a noise variability estimator determining an amount of variability of background noise ($\sigma_n$) in a speech-plus-noise signal and for determining an SNR gain threshold ($\sigma_{th}$); and
   a channel gain generator adjusting a gain ($\gamma_{DB}$) applied to the speech-plus-noise signal based on the SNR gain threshold such that $$\gamma_{DB}(i) = \mu_g(\sigma_q''(i) - \sigma_{th}(\sigma_n)) + \gamma_n$$

wherein
   $\mu_g$ is a gain slope,
   $\sigma_q''(i)$ is a channel SNR for channel i,
   $\gamma_n$ is a minimum overall gain.

2. The apparatus of claim 1 wherein the speech-plus-noise signal is attenuated a first amount when the variability in background noise is high, otherwise the speech-plus-noise signal is attenuated a second amount.

3. The apparatus of claim 1 wherein the channel gain generator adjusts the gain of the speech-plus-noise signal by increasing the signal-to-noise (SNR) gain threshold when there exists a high variability in the background noise, wherein the speech-plus-noise signal will have a maximum attenuation when the SNR value of the speech-plus-noise signal is below the SNR gain threshold.

4. The apparatus of claim 3 wherein the maximum attenuation is based on the variability in background noise.

5. The apparatus of claim 1 farther comprising:
   a channel signal-to-noise (SNR) estimator; and
   wherein the noise variability estimator comprises an SNR variability estimator.

6. An apparatus for noise suppression, the apparatus comprising:
   a channel signal energy estimator for estimating a total energy of a speech-plus-noise signal;
   a noise energy estimator for estimating a noise energy of the speech-plus-noise signal;
   a channel signal-to-noise (SNR) estimator having the noise energy estimate and the total energy estimate as an input and outputting an SNR estimate of the speech-plus-noise signal;
   a SNR variability estimator for estimating the SNR variability ($\sigma_n$) of the noise energy estimate and for determining an SNR gain threshold ($\sigma_{th}$); and
   a channel gain generator for adjusting a gain ($\gamma_{DB}$) of the speech-plus-noise signal based on the SNR variability of the noise energy estimate such that $$\gamma_{DB}(i) = \mu_g(\sigma_q''(i) - \sigma_{th}(\sigma_n)) + \gamma_n$$

wherein
   $\mu_g$ is a gain slope,
   $\sigma_q''(i)$ is a channel SNR for channel i,
   $\gamma_n$ is a minimum overall gain.

7. The apparatus of claim 6 wherein the speech-plus-noise signal is attenuated a first amount when the SNR variability is high, otherwise the speech-plus-noise signal is attenuated a second amount.

8. The apparatus of claim 6 wherein the channel gain generator increases an SNR threshold when there exists a high SNR variability, wherein the speech-plus-noise signal will have a maximum attenuation when the SNR estimate of the speech-plus-noise signal is below the SNR threshold.

9. The apparatus of claim 8 wherein the maximum attenuation is based on the SNR variability.

10. A method for noise suppression, the method comprising the steps of:
   estimating an amount of variability in background noise in a speech-plus-noise signal;
   determining an SNR gain threshold that is a function of the amount of variability in the background noise in a speech-plus-noise signal; and
   adjusting a channel gain applied to the speech-plus noise signal based on the SNR gain threshold, wherein the SNR gain threshold is the value of a channel SNR where the channel gain begins to increase from a minimum value.

11. The method of claim 10 farther comprising the step of:
   attenuating the speech-plus-noise signal a first amount when the SNR variability is high, otherwise attenuating the speech-plus-noise signal a second amount.

12. The method of claim 10 wherein the step of adjusting the gain comprises the step of attenuating the speech-plus-noise signal a first amount when the variability in background noise is high, otherwise attenuating the speech-plus-noise signal a second amount.

13. The method of claim 10 wherein the step of adjusting the gain comprises the step of adjusting a gain in the speech-plus-noise signal by increasing a signal-to-noise (SNR) threshold when there exists a high variability in the background noise, wherein the speech-plus-noise signal will have a maximum attenuation when the SNR value of the speech-plus-noise signal is below the SNR threshold.

14. The method of claim 10 wherein the channel gain ($\gamma_{DB}(i)$) is adjusted according to the relations:

$$\gamma_{DB}(i) = \mu_g(\sigma_q''(i) - \sigma_{th}(\sigma_n)) + \gamma_n$$

and $$\gamma_n \leq \gamma_{DB}() \leq 0$$

where
$\mu_g$ is a gain slope,
$\sigma_q''$ is the channel SNR for channel i,
$\sigma_{th}(\sigma_n)$ is the SNR gain threshold as a function of the background noise variability $\sigma_n$,
$\gamma_n$ is a minimum overall gain.

* * * * *

UNITED STATES PATENT AND TRADEMARK OFFICE
CERTIFICATE OF CORRECTION

PATENT NO. : 7,283,956 B2  Page 1 of 1
APPLICATION NO. : 10/245963
DATED : October 16, 2007
INVENTOR(S) : James Patrick Ashley et al.

It is certified that error appears in the above-identified patent and that said Letters Patent is hereby corrected as shown below:

In Column 8, Line 18, in Claim 14, delete "$\gamma n \leq \gamma DB(\ ) \leq 0$" and insert -- $\gamma n \leq \gamma DB(i) \leq 0$ --, therefor.

In Column 8, Line 22, in Claim 14, delete "$\sigma q'''$" and insert -- $\sigma q''(i)$ --, therefor.

In Column 8, Line 23, in Claim 14, delete "$\sigma th(\sigma n$" and insert -- $\sigma th(\sigma n)$ --, therefor.

Signed and Sealed this

Ninth Day of June, 2009

JOHN DOLL
*Acting Director of the United States Patent and Trademark Office*